United States Patent [19]

Junier

[11] Patent Number: 5,303,740

[45] Date of Patent: Apr. 19, 1994

[54] LINE BLIND ASSEMBLY HAVING DISC AND SPACER RING SELECTIVELY DISPOSABLE BETWEEN ENDS OF TUBULAR MEMBERS

[75] Inventor: Marius R. Junier, Houston, Tex.

[73] Assignee: Triten Corporation, Houston, Tex.

[21] Appl. No.: 968,204

[22] Filed: Oct. 29, 1992

Related U.S. Application Data

[63] Continuation-in-part of Ser. No. 694,433, May 1, 1991.

[51] Int. Cl.$^5$ .............................................. F15D 1/00
[52] U.S. Cl. ..................................... 138/44; 138/54.3
[58] Field of Search ................. 138/40, 44, 94.3, 94.5, 138/89

[56] References Cited

U.S. PATENT DOCUMENTS 1,000,173  8/1911  Hughes ............................... 138/94.3
1,506,021  8/1924  McGee ................................ 138/94.3

Primary Examiner—James E. Bryant, III
Attorney, Agent, or Firm—Vaden, Eickenroht, Thompson, Boulware & Feather

[57] ABSTRACT

There is disclosed a line blind assembly having a pair of tubular members adapted to be connected in a flowline and connected to one another by bolts having nuts on their ends to permit sealing faces on the inner ends of the tubular members to be tightly engaged with sealing faces on the opposite sides of either a disc or a spacer ring upon removal of the other from within the space. A series of circumferentially spaced, hydraulically operable, extendable and retractable actuators are connected at one end to one tubular member and the other end to the other tubular member, so that the sealing faces may be moved toward and away from one another independently of the bolts and nuts.

12 Claims, 4 Drawing Sheets

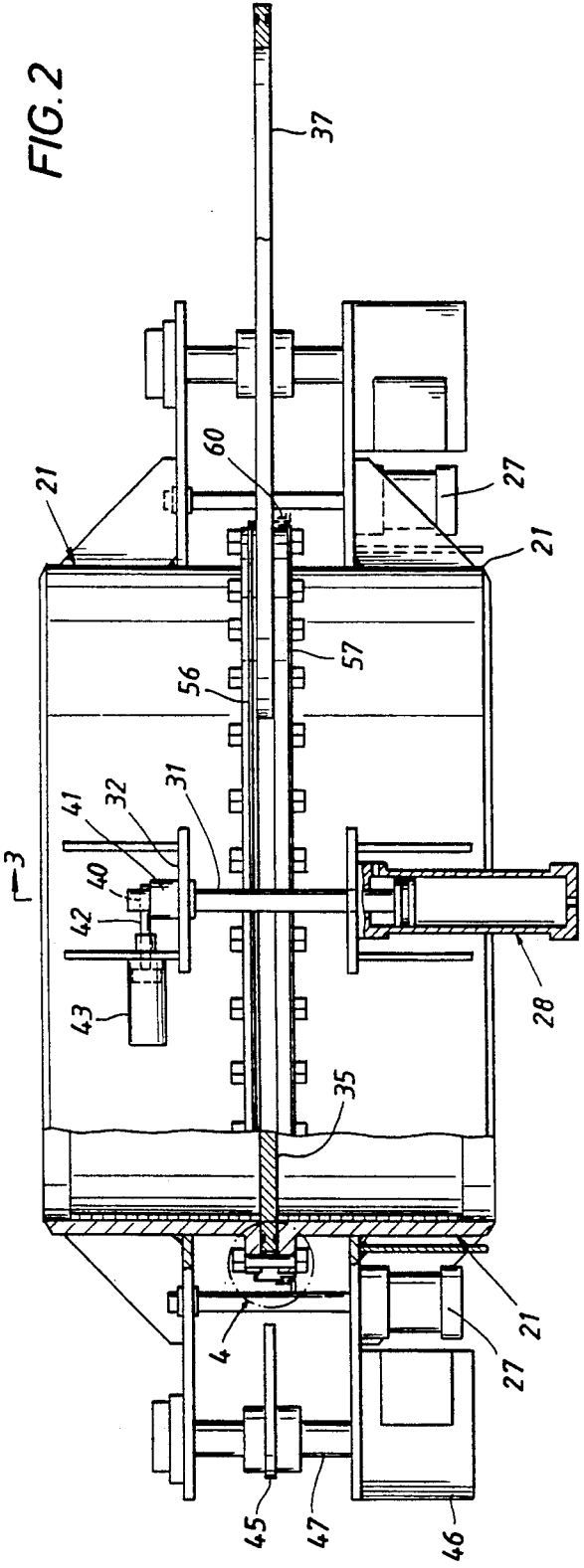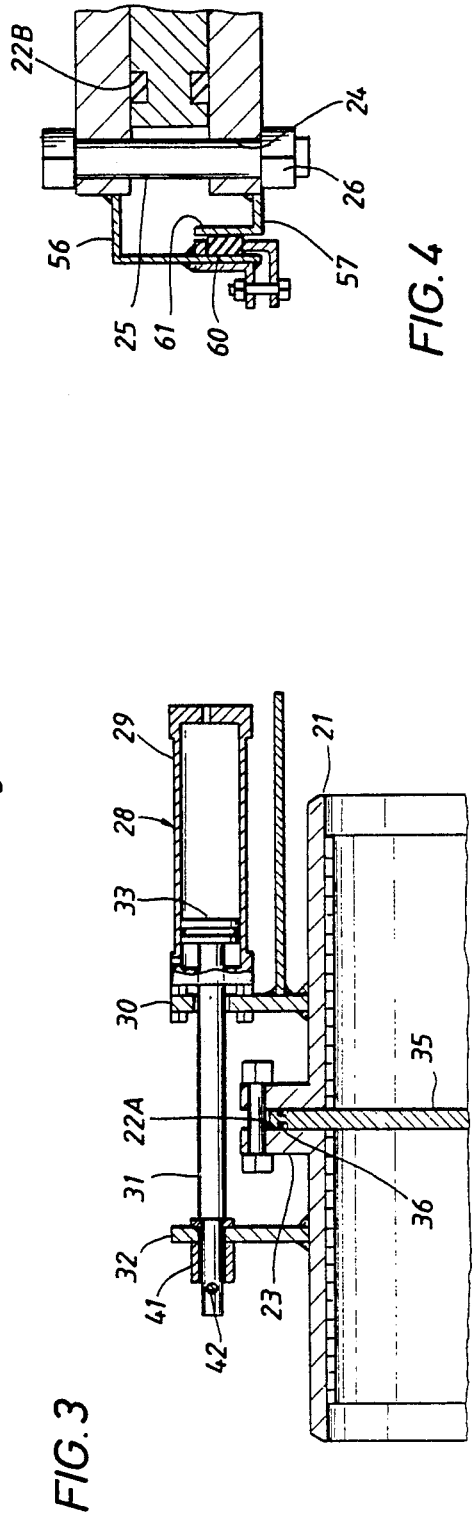

LINE BLIND ASSEMBLY HAVING DISC AND SPACER RING SELECTIVELY DISPOSABLE BETWEEN ENDS OF TUBULAR MEMBERS

This application is a Continuation in part of my co-pending application, Ser. No. 07/694,433, filed May 1, 1990, and entitled "Line Blind Assembly" now abandoned.

This invention relates generally to a line blind assembly for selectively opening or closing a flowline in which it is connected. More particularly, it relates to improvements in an assembly of this type in which each of a disc and spacer ring may be moved into and out of a space between opposed sealing faces of tubular members connected in the line, when the other is removed therefrom, so as to close the flowline when the disc is in place and open it when the spacer ring is in place.

Conventionally, the members are connected by a circle of bolts extending through the members outside of the sealing faces and having nuts on their ends which may be tightened or loosened to permit the sealing faces to be moved toward one another to sealably engage with sealing faces on the opposite sides of the disc or spacer ring or permit them to be moved away from one another when either is to be removed and replaced by the other. More particularly, the nuts may be removed from bolts and the bolts removed from across the space on one side of the members to permit the disc or ring to be moved into or out of the space. Conventionally, suitable actuators are mounted on the members for moving the sealing faces toward and away from one another independently of the nuts and bolts.

The use of such assemblies in flowlines which carry high temperature and/or hazardous fluids present particular problems. Thus, such fluids may seriously injure personnel who may be present in and around the assembly in order to remove and replace each of the disc and spacer ring, and may also damage surrounding equipment, as the space between the members is opened to replace one of the disc and ring with the other. Also, of course, the assembly must be able to accommodate large temperature differentials between its members, which may occur when the line is closed and one end is connected to a high temperature source.

An object of this invention is to provide such a line blind assembly which permits each of the disc and spacer ring to be removed and replaced with the other without the need for operating personnel in and around the immediate area and preferably without damage to surrounding equipment.

A further object is to provide such an assembly which is able to accommodate large temperature differences.

Still another object is to provide such an assembly which is of such construction as to permit repair and/or replacement of the disc and spacer ring with a minimum of downtime and expense.

These and other objects are accomplished in accordance with the illustrated embodiment of the invention, by an assembly of this type having a series of circumferentially spaced, extendable and retractable actuators each having one connected to one tubular member and the other end connected to the other tubular member, whereby the sealing faces may be moved toward or away from one another independently of the bolts and nuts. More particularly, the assembly also includes means for moving each of the disc and spacer ring between the members on one side of the body into and out of a position to dispose annular sealing faces on its opposite sides between the sealing faces on the members when the other is removed therefrom. In the preferred and illustrated embodiment of the invention, the actuators and the means for moving the disc and spacer ring are hydraulically operated—i.e., the source of power is hydraulic fluid.

The one end of each actuator on said one side of the body is releasable from its connection to the one tubular member, and is retractable, when so released, to a position in which, when the bolts are removed from extensions thereacross said one side, the disc or spacer ring may be moved through said one side. More particularly, remotely operable means are provided for selectively connecting or releasing the one end of each said actuator to or from said one tubular member, whereby the members and the disc and spacer ring may be selectively moved by personnel at locations remote from the assembly. Preferably, the one end of each said actuator is releasably connected to the one member by a pin mounted on a solenoid on the one member for movement into and out of a hole in each said actuator when extended.

As illustrated, each of disc and spacer ring is preferably carried by an arm pivotally mounted on one of the tubular members for swinging into and out of said position between the sealing faces, and the means for moving each comprises a pinion on each arm and a reciprocable rack on the one member engaging the pinion.

The sealing faces of each of the disc and spacer ring comprise gaskets on the opposite sides thereof. Also, each actuator includes a rod extending through an enlarged hole in the tubular member to which its connected to permit radial expansion and contraction between said members, as might occur due to large temperature differences between the fluids on opposite sides of the disc in closed position.

In accordance with another novel aspect of the invention, the assembly includes a shield which has a closed end mounted on the body to close the space between the tubular member on the other side thereof and which has an open end extending from its closed end and beyond the space on said one side thereof so as to confine the flow of line fluid escaping therefrom. As shown, the open end of the shield is slotted to permit each of the disc and spacer ring to move therethrough. The shield comprises a pair of plates each fixed to one member and overlapping the other at its closed end as the tubular members are moved toward and away from one another and spaced from the other at the open end to form the slots.

In the drawings, wherein like reference characters are used throughout to designate like parts;

FIG. 2 is a view of the upper end of the assembly, as shown in FIG. 1, but with parts thereof broken away to show the disc sealably engaged between the inner ends of the tubular members:

FIG. 3 is a vertical cross sectional view of the upper portion of the assembly, as seen along broken lines 3—3 of FIG. 2.:

FIG. 4 is an enlarged partial sectional view of the portion of the inner ends of the tubular members and a disc therebetween as indicated by the encircled area "4" in FIG. 2.:

Figure 5:
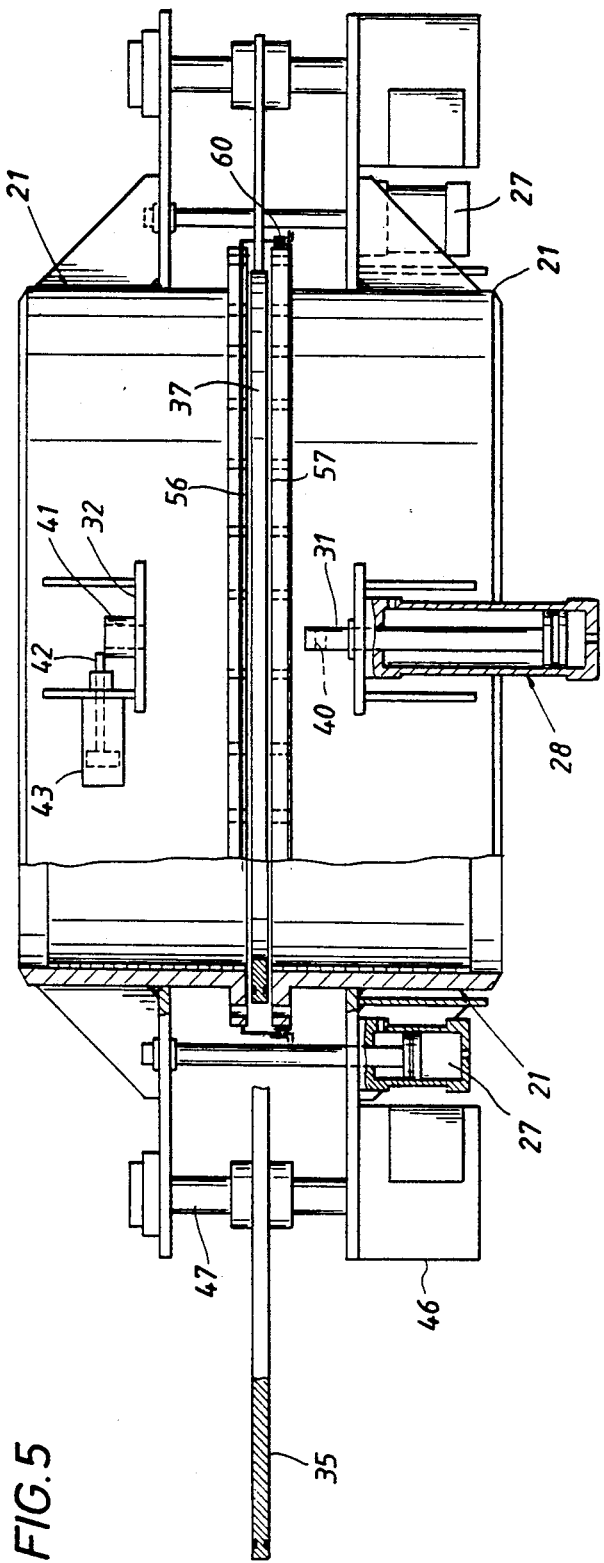
FIG. 5 is a top view similar to FIG. 3, but with the sealing faces of the tubular members moved apart and the end of one of the actuators released from its connection to the tubular member at the top side of the assembly to permit the disc to be moved out of and to one side of the space between the sealing faces and the spacer ring to be moved into the space.
Figure 6:
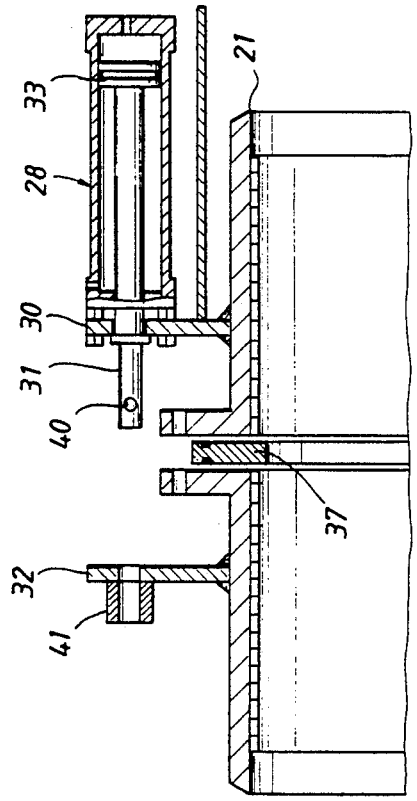
Figure 7:
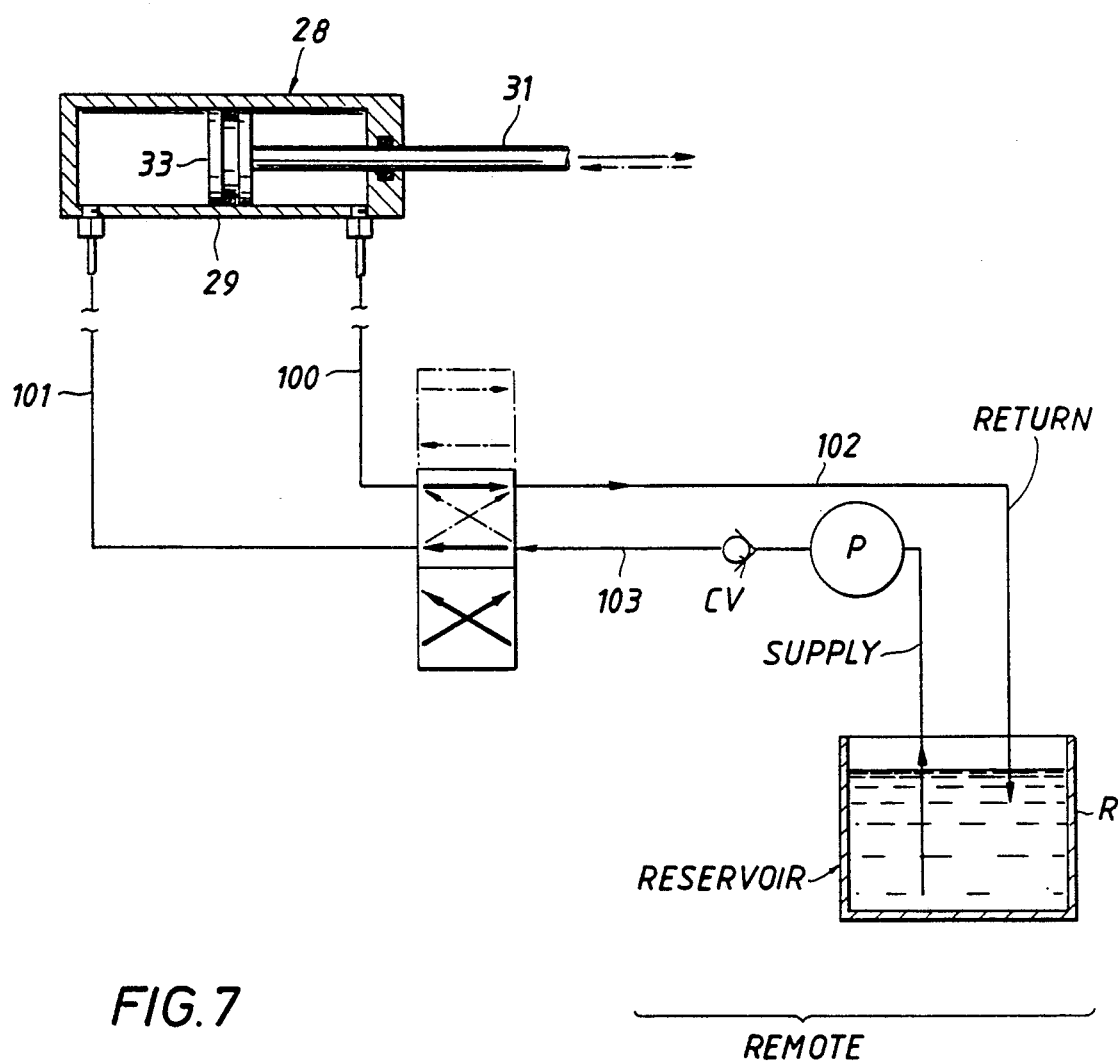

FIG. 6 is a cross sectional view, similar to FIG. 3, but with the sealing faces of the tubular members moved apart and the one end of the upper actuator released, as shown in FIG. 5; and FIG. 7 is a cross-sectional view of a typical extendible and retractable actuator forming part of the line blind assembly together with a schematic illustration of an hydraulic system for operating it from a location remote to the assembly.

With reference now to the details of the above described drawings, the overall line blind assembly, which is indicated in its entirety by reference character 20, comprises a pair of tubular members 21 each having an outer end 22 adapted to be connected in a flowline (not shown) and an annular sealing face 22A on its inner end. More particularly, each tubular member has an outwardly extending flange 23 on its inner end on which the sealing surface 22B is formed, and a circle of holes 24 formed therein outwardly the sealing face 22A. Thus, as previously described, bolts 25 carrying nuts 26 threaded over one end extend through the holes 24 so as to connect the tubular members with their sealing faces disposed opposite one another.

The assembly also includes a series of circumferentially spaced, hydraulically operable extendable and retractable actuators 27 and 28 each having one end connected to one tubular member and the other end connected to the other tubular member. More particularly, each such actuator comprises a cylinder 29 connected to a bracket 30 on one tubular member (right hand as shown in FIG. 3) and a rod 31 extending from the cylinder and connected at its opposite end to a bracket 32 of the other tubular member (left hand in FIG. 3). More particularly, a piston 33 reciprocable within the cylinder is connected to the rod 31 for extension and retraction with respect to the cylinder. Suitable ports are provided in the cylinder for supplying the hydraulic fluid to and exhausting it from opposite sides of the piston to cause it to reciprocate in the desired direction.

More particularly, as shown in FIG. 7, the ports in the cylinder of a typical actuator 28 are connected to lines 100 and 101 for supplying hydraulic fluid from a reservoir R to one side of the piston while exhausting it from the other. These lines are in turn connected to the reservoir by "return" line 102 and "supply" line 103 by means of valve v, so that with the valve shown in the solid line position, fluid from the reservoir is supplied through line 103 to line 101 and thus into the cylinder on the left side of the piston, while fluid is exhausted from the right side of the piston through lines 100 and 102 back to the reservoir. As a result, the piston and rod are caused to move to the right, as indicated by the solid arrow.

Conversely, upon movement of the valve to its broken line position, fluid from the reservoir is supplied through lines 103 and 100 to the right side of the piston, while fluid is exhausted from the left side of the piston through lines 101 and 102 back to the reservoir. As a consequence, the piston and rod are caused to move to the left as shown by the broken arrow.

It is then in this sense that the actuator 28, and others described in this application, are referred to as "hydraulically operable." That is, the hydraulic system including the source or reservoir of hydraulic fluid causes them to be operated in response to the supply and exhaust of hydraulic fluid to and from opposite sides of the actuator piston.

As well-known in the art, fluid is drawn from the reservoir by a pump P in the line 103, and is prevented from back flow through the line 103 by a check valve CV.

As indicated by the breaks in lines 100 and 101, it is contemplated that the hydraulic system may be at a location remote from the actuator and thus the line blind on which it is mounted. It is in this sense that this or other hydraulically operated actuators described in this application are referred to as "remotely operable."

It will also be understood that the source of power for operating the actuator may be pneumatic or electrical—i.e., pneumatically or electrically operated actuators. When the system including the source is at a location remote from the actuators, they are "remotely operable."

The assembly further includes a disc 35 which, as shown in FIGS. 1 to 4, may be disposed within a space between the sealing faces 22A of the flanges 23 inside the circle of bolts so as to close the flowline. More particularly, a gasket 36 is mounted on each side of the disc for sealably engaging the opposite sealing face of one of the tubular members when the nuts are tightened on the bolts.

The assembly further includes a spacer ring 37 which is of basically the same outside diameter of the disc, and which has an inner diameter corresponding to the inner diameter of the tubular members to provide a full opening through the assembly. Similarly to the disc, the spacer ring carries gaskets 38 on the sealing faces of its opposite sides so as to sealably engage with the sealing faces of the tubular members when the ring is disposed between them and the nuts are tightened on the bolts.

When it is desired to replace one of the disc and ring with the other, the nuts are loosened and the bolts removed from the circle of holes on one side to permit the rods of the actuators to be extended by the supply of hydraulic fluid to the outer sides of the pistons. This widens the space between the sealing faces of the tubular members, as shown in FIGS. 5 and 6, so as to permit the replacement of one with the other. Then the rods of the actuators may be retracted by the supply of hydraulic fluid to the inner sides of the pistons, so as to move the sealing faces on the tubular members back into tight engagement with the sealing faces on the opposite sides of the disc or spacer ring, following which the nuts may be tightened on the bolts and the hydraulic fluid relieved from the actuators.

Figure 1:
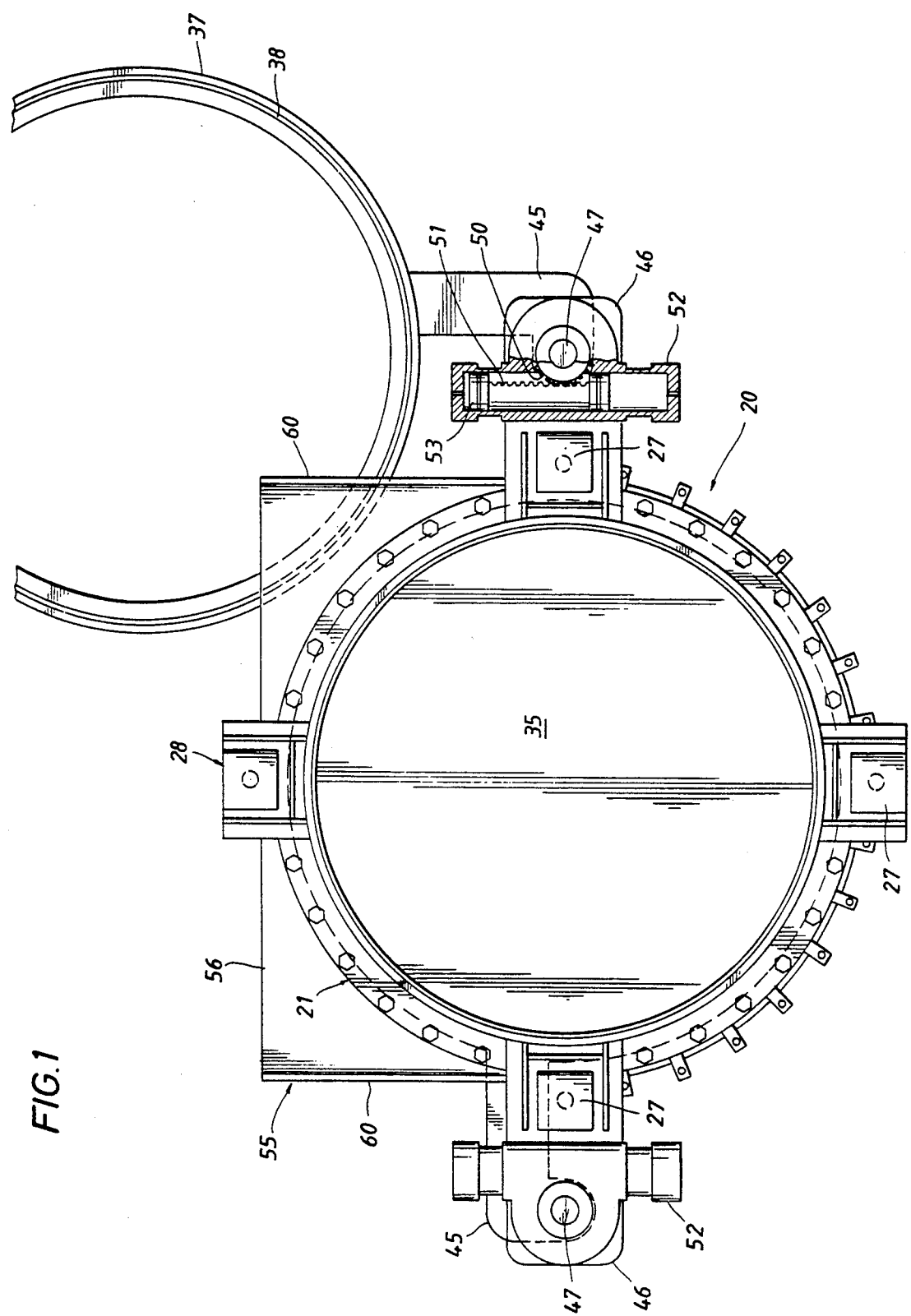
FIG. 1 is a vertical sectional view of a line blind assembly constructed in accordance with the present invention, and showing the disc disposed between the sealing faces of the tubular members of the assembly, and the spacer ring moved to a position to one side of the space.

Each of the disc and spacer ring is moveable into and out of the space between the tubular members through the top side thereof, as shown in FIG. 1. In order to permit this movement, it is necessary to not only loosen the nuts and remove the bolts from the top side of the circle of bolts, but also, as best shown in FIGS. 5 and 6, withdraw the rod of the actuator on the top side of the tubular members from disposal across the space. In order to permit this movement of the rod of the upper actuator, its outer end is releasable from the upper tubular member, and the cylinder in which the piston connected to the outer end of the rod is reciprocable is of sufficient length to permit this additional travel of the rod, as compared with the limited travel of the rods of the other actuators.

For this purpose, the outer end of the rod of the upper actuator has a hole 40 therethrough adapted to be disposed to the left of a collar 41 on the bracket 32 when the rod is extended, as shown in FIG. 3, and is releasably connected to the left hand tubular member by means of a pin 42 on the outer end of a solenoid 43 mounted on the bracket. More particularly, actuation of the solenoid will retract the pin 42 out of the hole 40 and thus permit the rod to be retracted to the position shown in FIGS. 5 and 6 to open the space of the upper side of the tubular members, whereby the disk and the spacer ring may be moved through the space between the upper sides of the tubular members. The solenoid is also remotely operated in the sense that the switch for actuating it is at a location remotely from the line blind.

In any case, however, the upper actuator also functions as do the other actuators to move the tubular members toward and away from one another when its outer end is connected to the upper tubular member. Thus, when the sealing faces of the tubular members are to be moved toward one another to sealably engage opposite faces of the disc or spacer ring, the rod of the upper actuator is extended to dispose the hole 40 therethrough in a position to receive the pin 41 on the outer end of the solenoid.

As best shown in FIG. 1, each of the spacer ring and disc is carried on an arm 45 pivotally connected to a bracket 46 on one side of one tubular member by means of a pin 47 extending through spaced arms of the bracket, as best shown in FIGS. 2 and 4. The arm 45 and bracket 46 are of such extent that rotation of each of the disc and spacer ring approximately 90° will cause it to move between the space between the tubular members to a position above and to one side thereof, to the right in the case of the spacer ring as shown in FIG. 1 and to the left in the case of the disc. When removed from the space, neither the disc nor spacer ring will interfere with the other as the other is moved into and out of the space.

The arm for each of the disc and spacer ring is so moved by means of a pinion 50 mounted about the pivot pin and engaged by rack 51 reciprocal within a cylinder 52 extending transversely of the bracket. As shown, pistons 53 on each end of the rack may be reciprocated within the cylinder by the supply and exhaust of hydraulic fluid to and from opposite sides of the pistons.

As previously described, a shield or shroud is mounted on the tubular members so as to confine the flow of fluid in the flowline, during replacement of the disc or spacer ring, to an area removed from surrounding equipment, and preferably in an upward direction, as shown in FIG. 1. More particularly, the shield or shroud includes an arcuate end mounted on the lower side of the tubular members to close the lower end of the space between the tubular members, and an open upper end on the other side of the tubular members to confine substantially all of the flow from between the space in an upward direction. Thus, as shown, the shield, which is indicated in its entirety by reference character 55, comprises a pair of plate like sections 56 and 57, one connected to one tubular member and the other to the other tubular member. The lower arcuate end of the section 56 is connected to the upper tubular member as viewed in FIGS. 2, 4 and 5, while a lower arcuate end of the section 57 is connected to the lower tubular member shown in these figures.

The edges of these lower ends of the sections overlap one another so as to close the space between the lower sides of the tubular members, and then extend upwardly and generally tangentially to a height above the opposite upper sides of the tubular members, as shown in FIG. 1. More particularly, the edges of these upward ends of the sections are spaced from one another to form slots 60 through which the disc and spacer ring may move into and out of the space between the tubular members. Thus, the flow of line fluid is substantially confined as it moves upwardly from the upper end of the space between the tubular members.

As shown in FIG. 4, a gasket 60a is mounted on the inner side of a flange on the section 56 near its lower end for sealably engaging a flange 61 extending inwardly from the inner side of the section 57, thus sealing between the sections of the shroud as the sealing faces of the tubular members are moved toward and away from one another.

As shown in FIG. 3, each of the rods 31 of the actuators extends through an enlarged hole in the bracket 32. Thus, the tubular members are free to expand and contract with respect to one another, even though one such member may be at a temperature considerably different from that of the other, as might occur, for example, upon closing of the flowline downstream of a high temperature heat source.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A line blind assembly, comprising
   a pair of tubular members each having an outer end adapted to be connected in a flowline and an inner end with an annular sealing face,
   a circle of bolts extending through the members outwardly of the sealing faces and nuts on the bolts to connect the members with sad sealing faces in opposed relation and permit the sealing faces to be moved toward or away from one another as the nuts are tightened and loosened on the bolts,
   a series of circumferentially spaced, hydraulically operable extendable and retractable actuators each having one end connected to one tubular member and the other end connected to the other tubular member whereby the sealing faces may be moved toward or away from one another independently of the bolts and nuts,
   a disc and a spacer ring each having annular sealing faces on the opposite sides and mounted on one of the members for movement between the members on one side thereof into and out of a position to dispose the annular sealing faces between the sealing faces on the members when the other is removed therefrom, hydraulically operable means for so moving each of the disc and spacer ring, the one end of each actuator on said one side of the body being releasable from its connection to the one tubular member, and being retractable, when so released, to a position in which, when the bolts are removed from extension thereacross said one side, the disc or spacer ring may be moved through said one side, and remotely operable means by which the one end of each said actuator may be selectively connected to released to said one tubular member.

2. A line blind assembly of the character defined in claim 1, wherein said means by which the one end may be selectively connected or released comprises a hole in each said actuator, and a solenoid mounted on one member and having a pin for movement into and out of the hole in each said actuator when extended.

3. A line blind assembly of the character defined in claim 1, wherein each of disc and spacer ring is carried by an arm pivotally mounted on one of the tubular members for swinging into and out of said position between the sealing faces.

4. A line blind assembly of the character defined in claim 3, wherein said means for moving each of the spacer ring and disc comprises a pinion on each arm and a reciprocable rack on the one member engaging the pinion.

5. A line blind assembly of the character defined in claim 1, wherein the sealing faces of each of the disc and spacer ring comprise gaskets on the opposite sides thereof.

6. A line blind assembly of the character defined in claim 1, wherein each actuator includes a rod extending through an enlarged hole in the tubular member to which its connected to permit radial expansion and contraction between said members.

7. A line blind assembly, comprising a pair of tubular members each having an outer end adapted to be connected in a flowline and an inner end with an annular sealing face, a circle of bolts extending through the members outwardly of the sealing faces and nuts on the bolts to connect the members with said sealing faces in opposed relation and permit the sealing faces to be moved toward or away from one another as the nuts are tightened and loosened on the bolts, a series of circumferentially spaced, hydraulically operable extendable and retractable actuators each having one end connected to one tubular member and the other end connected to the other tubular member whereby the sealing faces may be moved toward or away from one another independently of the bolts and nuts, a disc and a spacer ring each having annular sealing faces on the opposite sides and mounted on one of the members for movement between the members on one side thereof into and out of a position to dispose the annular sealing faces between the sealing faces on the embers when the other is removed therefrom, hydraulically operable means for so moving each of the disc and spacer ring, the one end of each actuator on said one side of the body being releasable from its connection to the one tubular member, and being retractable, when so released, to a position in which, when the bolts are removed from extension thereacross said one side, the disc or spacer ring may be moved through said one side, and operable means by which the one end of each said actuator may be selectively connected or released to said one tubular member.

8. A line blind assembly of the character defined in claim 1, wherein said means by which the one end may be selectively connected or released comprises a hole in each said actuator, and a solenoid mounted on one member and having a pin for movement into and out of the hole in each said actuator when extended.

9. A line blind assembly of the character defined in claim 8, wherein each of disc and spacer ring is carried by an arm pivotally mounted on one of the tubular members for swinging into and out of said position between the sealing faces.

10. A line blind assembly of the character defined in claim 9, wherein said means for moving each of the spacer ring and disc comprises a pinion on each arm and a reciprocable rack on the one member engaging the pinion.

11. A line blind assembly of the character defined in claim 7, wherein the sealing faces of each of the disc and spacer ring comprise gaskets on the opposite sides thereof.

12. A line blind assembly of the character defined in claim 7, wherein each actuator includes a rod extending through an enlarged hole int he tubular member to which its connected to permit radial expansion and contraction between said members.

* * * * *